United States Patent
Goldman et al.

(10) Patent No.: US 7,770,015 B1
(45) Date of Patent: Aug. 3, 2010

(54) SIGNATURES FOR MULTIPLE ENCODINGS

(75) Inventors: Oliver Goldman, Redwood City, CA (US); Jeff Young, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1030 days.

(21) Appl. No.: 11/134,126

(22) Filed: May 20, 2005

(51) Int. Cl.
*H04L 9/00* (2006.01)

(52) U.S. Cl. .............. 713/176; 713/177; 713/179; 713/180; 380/277

(58) Field of Classification Search ............ 713/176, 713/177, 179, 180; 380/277
See application file for complete search history.

(56) References Cited

U.S. PATENT DOCUMENTS

| | | | | |
|---|---|---|---|---|
| 5,958,051 A | * | 9/1999 | Renaud et al. | 726/22 |
| 6,772,196 B1 | * | 8/2004 | Kirsch et al. | 709/206 |
| 6,947,954 B2 | * | 9/2005 | Cohen et al. | 707/104.1 |
| 7,100,008 B2 | * | 8/2006 | Yagawa | 711/162 |
| 7,120,675 B1 | * | 10/2006 | Shupak et al. | 709/217 |
| 7,249,259 B1 | * | 7/2007 | Vanstone et al. | 713/180 |
| 7,340,611 B2 | * | 3/2008 | Alev et al. | 713/180 |
| 7,356,764 B2 | * | 4/2008 | Radja et al. | 715/234 |
| 7,417,570 B2 | * | 8/2008 | Srinivasan et al. | 341/87 |
| 2001/0055138 A1 | * | 12/2001 | Richardson et al. | 359/173 |
| 2002/0023220 A1 | * | 2/2002 | Kaplan | 713/176 |
| 2002/0044662 A1 | * | 4/2002 | Sowler | 380/277 |
| 2003/0177435 A1 | * | 9/2003 | Budd et al. | 714/776 |
| 2004/0153452 A1 | * | 8/2004 | Carro | 707/9 |
| 2004/0177253 A1 | * | 9/2004 | Wu et al. | 713/176 |
| 2004/0199876 A1 | * | 10/2004 | Ethier et al. | 715/523 |
| 2005/0050332 A1 | * | 3/2005 | Serret-Avila et al. | 713/176 |
| 2005/0135260 A1 | * | 6/2005 | Todd | 370/241 |
| 2005/0177389 A1 | * | 8/2005 | Rakowicz et al. | 705/1 |
| 2005/0193202 A1 | * | 9/2005 | Gajjala et al. | 713/170 |
| 2005/0231738 A1 | * | 10/2005 | Huff et al. | 358/1.1 |
| 2006/0101271 A1 | * | 5/2006 | Thomas | 713/180 |
| 2008/0010218 A1 | * | 1/2008 | Zank | 705/75 |
| 2008/0175377 A1 | * | 7/2008 | Merrill | 380/30 |
| 2008/0237359 A1 | * | 10/2008 | Silverbrook et al. | 235/494 |

* cited by examiner

*Primary Examiner*—Carl Colin
(74) *Attorney, Agent, or Firm*—Van Pelt, Yi & James LLP

(57) ABSTRACT

Digitally signing data for multiple encodings is disclosed. A first signature of the data is generated. A second signature of a second encoding of the data is generated. The first signature and the second signature are associated with the signed data.

23 Claims, 5 Drawing Sheets

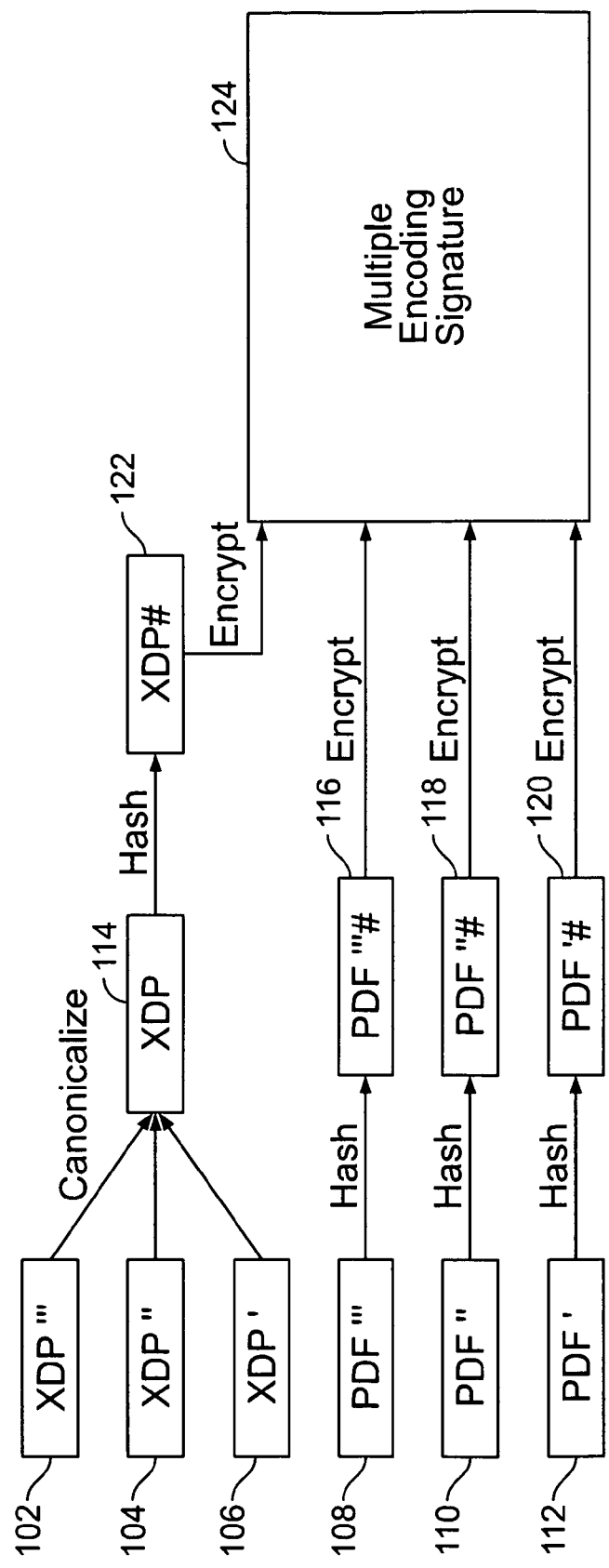

SIGNATURES FOR MULTIPLE ENCODINGS

BACKGROUND OF THE INVENTION

Digital signatures can be used to verify that an electronic document has not been altered since the creation of the digital signature based on the electronic document. In many systems, digital signature creation includes two parts, hashing and encryption of the produced hash. Hashing involves computing a hash (message digest) function over a sequence of encoded binary data.

An electronic document contains information that can be encoded as one or more different encodings. An encoding is binary data representing the digitally encoded form of the document information. For example, a document may be encoded as one of many PDF (Portable Document File developed by Adobe Systems of San Jose, Calif.) encodings or one of many XDP (XML, extensible markup language, Data Package) encodings.

The encoding is used to generate a hash using any hashing function. Once a hash has been computed, the hash is encrypted using an encryption algorithm. The recipient of the document can verify the digital signature by decrypting the digital signature to obtain the hash and comparing the hash to a new hash generated from the document using the same hashing function as the digital signature author. If the hashes match, the document is verified as being not altered from when the digital signature was produced.

Conceptually, a digital signature should apply to the information present in the document and not to the specific document encoding. Since current digital signature algorithms use binary data of a specific encoding to generate the digital signature, an already digitally signed document cannot be converted into a different encoding without invalidating the signature. This signature conversion problem arises when the desired encoding is a different encoding from the original document encoding, i.e. different PDF encoding conversion, different XDP encoding conversion, or PDF to XDP conversion. Even reordering XML data in a XDP file invalidates the signature. The signature conversion problem has been traditionally solved by using a canonical encoding (data is ordered in a predetermined and repeatable order) to generate a digital signature. The signature validation now requires an extra step of converting the document to the canonical encoding before reproducing the hash for hash comparison in validating the signature. This canonical conversion step can be computationally expensive. There exists a need to more efficiently validate digital signatures for multiple document encodings.

BRIEF DESCRIPTION OF THE DRAWINGS

Various embodiments of the invention are disclosed in the following detailed description and the accompanying drawings.

FIG. 1 is a block diagram illustrating an embodiment of a multiple encoding signature creation.

DETAILED DESCRIPTION

Figure 2A:
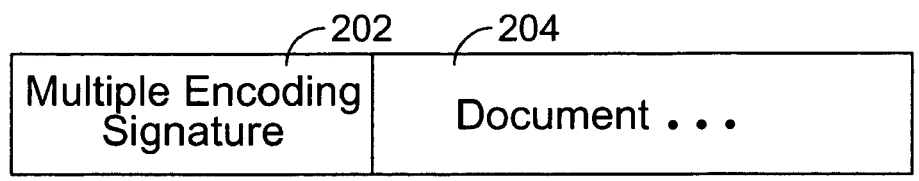
FIG. 2A illustrates an embodiment of a multiple encoding signature coupled to one or more electronic documents.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Creating and validating digital signatures for multiple encodings are disclosed. In some embodiments, creating a digital signature for a document includes computing a signature for two or more encodings of the document information. The signatures are labeled and packaged together as a multiple encoding signature. When a document with a multiple encoding signature is validated, a signature corresponding to the encoding of the document is located within the multiple encoding signature and used to validate the document. The document can be converted into another encoding for which a corresponding signature exists in the multiple encoding signature and still have a valid multiple encoding signature. If no exact signature corresponding to the encoding of the document is found, the document can be canonicalized before signature validation.

FIG. 1 is a block diagram illustrating an embodiment of a multiple encoding signature creation. In the example shown, three different XDP encodings, 102, 104, and 106, and three different PDF encodings, 108, 110, and 112, for a document are shown as encodings associated with multiple encoding signature 124. For example, difference between the different encodings of XDP or PDF can be due to different encoding versions and/or different ordering of data within the document. Any encoding used to encode data can be associated with multiple encoding signature 124, including any encoding variations on XDP encoding, XML encoding, Binary XML encoding, and PDF encoding. Any number of encodings can be associated with multiple encoding signature 124. The encodings associated with multiple encoding signature 124 can be preconfigured or dynamically configured.

XDP''' encoding 102, XDP'' encoding 104, and XDP' encoding 106 is canonicalized as XDP encoding 114. Any encoding variation or any number of encodings can be canonicalized into a common canonical form. In generating multiple encoding signature 124, a hash of various encodings is made. XDP encoding 114 is hashed to generate XDP hash 122. PDF'" encoding 108 is hashed to generate PDF'" hash 116. PDF" encoding 110 is hashed to generate PDF" hash 118. PDF' encoding 112 is hashed to generate PDF' hash 120. In some embodiments, one or more of XDP encoding variations, 102, 104, and 106, are hashed in addition to the canonical XDP encoding. Any hashing function can be used to generate the hashes, including the MD5 hashing function. One or more hashes produced from various encodings are encrypted and combined to form multiple encoding signature 124. The hashes can be combined before encryption or combined after individual encryption. Any encryption method may be used, including any public key encryption methods.

FIG. 2A illustrates an embodiment of a multiple encoding signature coupled to one or more electronic documents. Multiple encoding signature 202 comprises two or more hashes corresponding to one or more encodings of electronic documents contained in 204. In some embodiments, multiple encoding signature 202 is multiple encoding signature 124 of FIG. 1. In some embodiments, multiple encoding signature 202 comprises hashes for two or more unrelated documents contained in one or more documents of 204. Multiple encoding signature 202 and document 204 are coupled together in a single file. The multiple encoding signature can exists in any location of the file. In some embodiments, multiple encoding signature 204 and document 204 do not exist in the same file. For example, they may exist in different files and/or exist in a database. Multiple encoding signature 202 may be a part of another document signature.

Figure 2B:
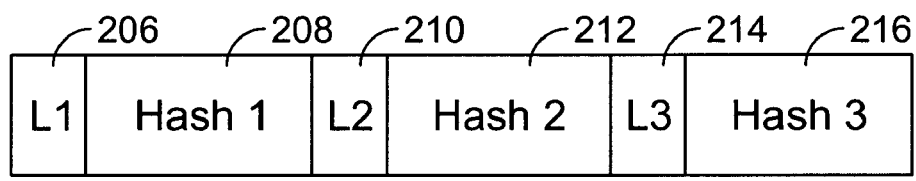
FIG. 2B illustrates an embodiment of a single encrypted multiple encoding signature.

FIG. 2B illustrates an embodiment of a single encrypted multiple encoding signature. In some embodiments FIG. 2B is the multiple encoding signature 202 of FIG. 2A. In the example shown, multiple hashes generated for different encodings have been combined before they are encrypted. The contents of the multiple encoding signature comprises hashes, 208, 212, and 216, and labels, 206, 210, and 214, corresponding to the hashes. There may any number of hashes and any number of labels. In some embodiments, a label corresponds to more than one hash. A label contains one or more data related to one or more hashes, including hash location, hash size, one or more encoding identifiers corresponding to one or more hashes, identifier identifying documents corresponding to one or more hashes, and any hash attributes. Two or more hashes and one or more labels are encrypted together to form a multiple encoding signature. The hashes may be encrypted separately from the labels. The labels may be unencrypted. The labels may be included as metadata, i.e. header data, of a document. The order of the hashes and/or labels within the multiple encoding signature may be preconfigured or dynamically configured. If the location and attributes of the hashes are predetermined, labels do not have to be included. In some embodiments, labels are not included in the multiple encoding signature.

Figure 2C:
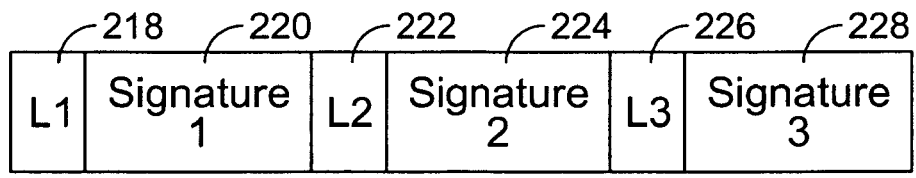
FIG. 2C illustrates an embodiment of a multiple encoding signature with individually encrypted hashes.

FIG. 2C illustrates an embodiment of a multiple encoding signature with individually encrypted hashes. In some embodiments FIG. 2C is the multiple encoding signature 202 of FIG. 2A. In the example shown, multiple hashes generated for different encodings are encrypted individually before they are packaged together as a multiple encoding signature. The contents of the multiple encoding signature comprise single encoding signatures, 220, 224, and 228, and labels, 218, 222, and 226, corresponding to individually encrypted hashes. There may any number of individually encrypted hashes and any number of labels. In some embodiments, a label corresponds to more than one individually encrypted hash. A label contains one or more data related to one or more individually encrypted hashes, including individually encrypted hash location, individually encrypted hash size, one or more encoding identifiers corresponding to one or more individually encrypted hashes, identifier identifying documents corresponding to one or more individually encrypted hashes, and any individually encrypted hash attributes.

Two or more individually encrypted hashes and one or more labels are packaged together to form a multiple encoding signature. The labels may be left unencrypted or encrypted separately or together with a corresponding individually encrypted hash. The labels may be included as metadata, i.e. header data, of a document. The order of the individually encrypted hashes and/or labels within the multiple encoding signature may be preconfigured or dynamically configured. If the location and attributes of the individually encrypted hashes are predetermined, labels do not have to be included. In some embodiments, labels are not included in the multiple encoding signature.

Figure 3:
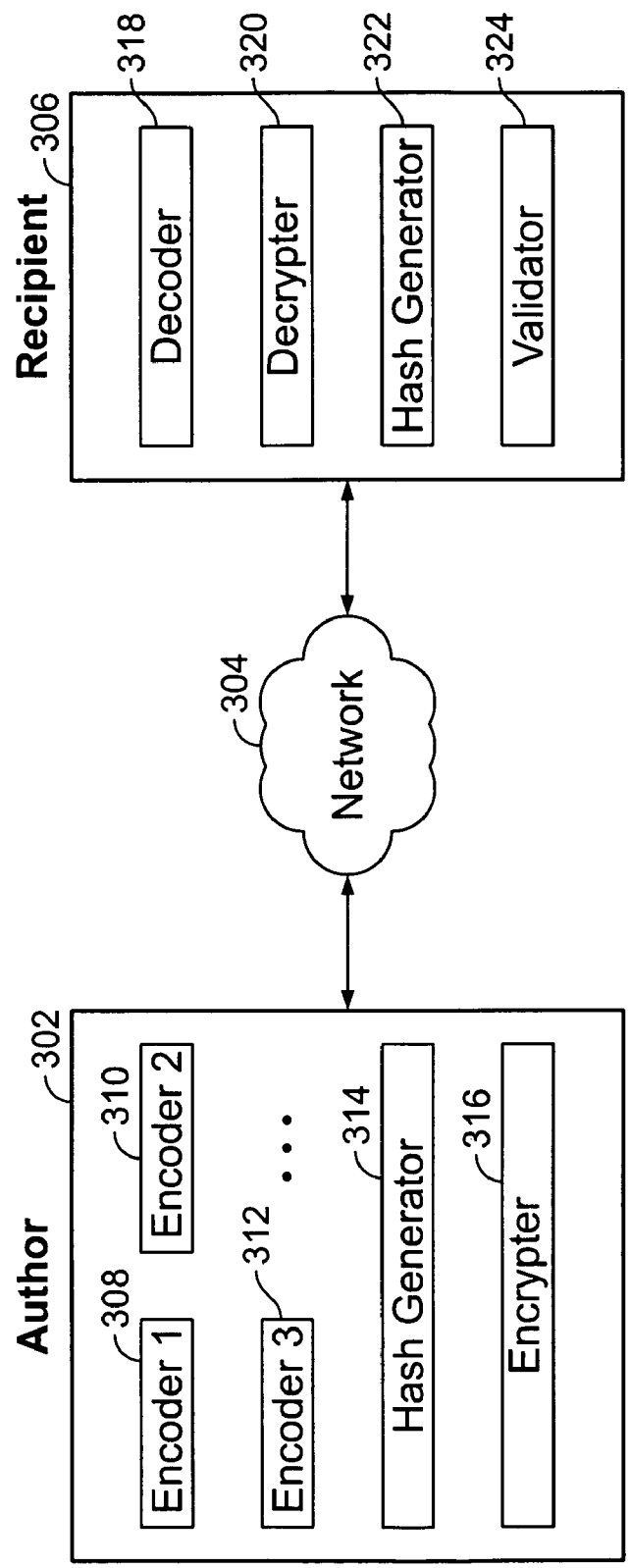
FIG. 3 is a block diagram illustrating an embodiment of a multiple encoding signature system.

FIG. 3 is a block diagram illustrating an embodiment of a multiple encoding signature system. In the example shown, author system 302 is connected to recipient system 306 by network 304. Author system 302 generates the multiple encoding signature and recipient system validates the multiple encoding signature. Network 304 is any public or private network and/or combination thereof, including without limitation the Internet, intranet, LAN, WAN, and other forms of connecting multiple systems and or groups of systems together. The network is used to send data between the author and the recipient. In some embodiments, the author and recipient system is physically located inside the same system. Author system 302 comprises encoders, 308, 310, and 312, hash generator 314, and encrypter 316. Encoders 308-312 each corresponds to one or more encodings used to encode one or more documents.

There can be any number of encoders. Hash generator 314 generates hashes based at least in part on encodings of one or more documents. Encrypter 316 encrypts one or more hashes individually or together in order to generate a multiple encoding signature. Recipient system 306 comprises decoder 318, decrypter 320, hash generator 322, and validator 324. Decoder 318 decodes the multiple encoding signature to determine and locate the hash needed to verify one or more documents. Decrypter 320 decrypts the encoded signature. For example, if the signature was encoded using a public key cryptography, the public key is used to decrypt the signature. Hash generator 322 generates the same hash used to generate the hash contained in the signature. Validator 324 compares the generated hash and the hash of the signature in order to validate the signature. Other components may exist in both the author and recipient system. This system diagram has been simplified to illustrate the embodiment clearly.

Figure 4:
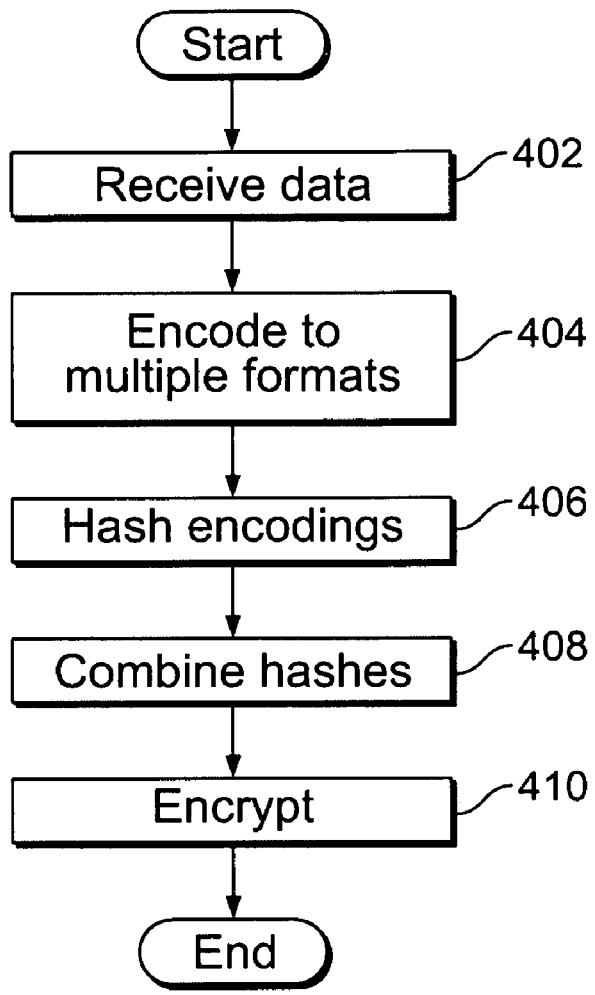
FIG. 4 illustrates an embodiment of a process for generating a multiple encoding signature.

FIG. 4 illustrates an embodiment of a process for generating a multiple encoding signature. In the example shown, data to be encoded is received at 402. At 404 the data is encoded to one or more encodings. Encodings to be produced are preconfigured and/or dynamically configured. A canonical encoding may be used as one or more of the encodings. In some embodiments, already encoded documents are received and one or documents may be converted to a canonical encoding. At 406, the encodings are hashed to produce hashes corresponding to each encoding. In some embodiments, only portions of the documents are hashed. The portions to be hashed can be preconfigured, dynamically configured, or specified by the author. At 408 the hashes are combined together. A label containing data corresponding to the hashes may be combined together with the hashes. At 410, the combined hashes are encrypted to produce a multiple encoding signature. In some embodiments, the hashes are encrypted individually to produce individual signatures to be combined into a multiple encoding signature. The multiple encoding signature may be packaged into together with one or more corresponding documents or data. In some embodiments, the signatures are stored in an order, e.g., a hierarchical order. In some embodiments, the signatures are stored in a separate module in an order, e.g., a hierarchical order. The hierarchical order may be based on any signature or electronic document attribute or data.

Figure 5:
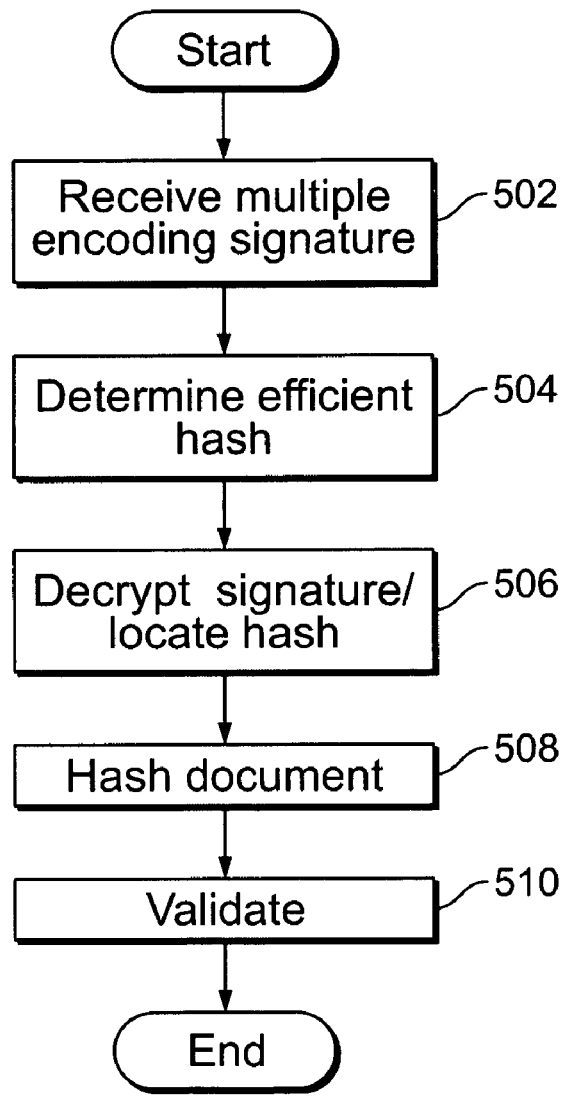
FIG. 5 illustrates an embodiment of a process for validating a multiple encoding signature.

FIG. 5 illustrates an embodiment of a process for validating a multiple encoding signature. The multiple encoding signature is received at 502. At 504, one or more efficient hashes that could be used to validate the document are determined. Efficient hashes include hashes not requiring canonicalization of the document to be verified and hashes requiring less than the maximum amount of computation required to convert/canonicalize the document to be verified. In some embodiments, one or more efficient hashes are requested from a module containing multiple hashes. At 506, the multiple encoding signature is decrypted and the most efficient hash contained in the multiple encoding signature is located. The most efficient hash may be a hash corresponding to the specific encoding of the document to be verified or a hash corresponding to an encoding that requires conversion of the document to be verified. If the document requires conversion, the document is converted/canonicalized to the required encoding. At 508, all or a portion of the document encoding corresponding to the most efficient hash is hashed with the same hashing algorithm used to generate the most efficient hash. At 510, the generated hash and the most efficient hash are compared to determine the validity of the signature. In some embodiments if the hashes match, the signature is verified.

The processes shown in FIGS. 4 and 5 and described above may be implemented in any suitable way, such as one or more integrated circuits and/or other device, or as firmware, software, or otherwise. Digital signatures for electronic documents have been described above as illustrative examples. Digital signatures can be used to sign and validate data other than electronic documents.

Although the foregoing embodiments have been described in some detail for purposes of clarity of understanding, the invention is not limited to the details provided. There are many alternative ways of implementing the invention. The disclosed embodiments are illustrative and not restrictive.

What is claimed:

1. A computer implemented method comprising:
generating a first signature of data using a processor, wherein the data is included in a first document, and wherein the first document has a first document encoding;
converting the first document from the first document encoding to a second document having a second document encoding, wherein the first document encoding and the second document encoding are different document encodings;
generating a second signature of data, wherein the data is included in the second document;
canonicalizing the first document from the first document encoding to a canonicalized first document having a canonical encoding, wherein canonicalizing the first document includes providing a different order of data within the first document based on a canonical ordering;
generating a third signature of data, wherein the data is included in the canonicalized first document; and
associating the first signature, the second signature, and the third signature with the first document to provide a digitally signed first document.

2. A computer implemented method as recited in claim 1, wherein the first signature, the second signature, and the third signature are transferred to a recipient.

3. A computer implemented method as recited in claim 1, wherein the first signature, the second signature, and the third signature are combined together to form a single multiple encoding signature.

4. A computer implemented method as recited in claim 3, wherein an order of the first signature, the second signature, and the third signature within a multiple encoding signature is predetermined.

5. A computer implemented method as recited in claim 1, wherein generating the first signature includes generating a signature for at least a portion of the data included in the first document.

6. A computer implemented method as recited in claim 1, wherein generating the first signature, the second signature, and the third signature includes generating a label associated with a hash.

7. A computer implemented method as recited in claim 6, wherein the label includes hash location, hash size, one or more encoding identifiers corresponding to one or more hashes, identifier identifying data corresponding to one or more hashes, and any hash attributes.

8. A computer implemented method as recited in claim 1, wherein the first signature, the second signature, and the third signature are included in a metadata of the first document.

9. A computer implemented method as recited in claim 1, wherein a data value corresponding to an order of the first signature, the second signature, and the third signature is included in a metadata of the first document.

10. A computer implemented method as recited in claim 1, wherein canonicalizing the first document includes canonicalizing at least a portion of the data of the first document.

11. A computer implemented method as recited in claim 1, wherein the first signature is a first encrypted hash, the second signature is a second encrypted hash, and the third signature is a third encrypted hash.

12. A computer implemented method as recited in claim 1, wherein the first signature, the second signature, and the third signature are each encrypted hashes, and wherein the first signature, the second signature, and the third signature are packaged together to form a multiple encoding signature.

13. A computer implemented method as recited in claim 1, wherein the one or more signatures are stored in a module separate from the digitally signed first document.

14. A computer implemented method as recited in claim 1, wherein the one or more signatures are stored in an order, including a hierarchical order.

15. A computer implemented method as recited in claim 1, wherein more than three signatures are generated.

16. A system comprising:
a processor configured to:
generate a first signature of data, wherein the data is included in a first document and wherein the first document has a first document encoding;
convert the first document from the first document encoding to a second document having a second document encoding, wherein the first document encoding and the second document encoding are different document encodings;

generate a second signature of data, wherein the data is included in the second document;

canonicalize the first document from the first document encoding to a canonicalized first document having a canonical encoding, wherein canonicalizing the first document includes providing a different order of data within the first document based on a canonical ordering;

generate a third signature of data, wherein the data is included in the canonicalized first document; and associate the first signature, the second signature, and the third signature with the first document to provide a digitally signed first document; and a memory coupled to the processor and configured to provide instructions to the processor.

17. A system as recited in claim 16, wherein the first signature, the second signature, and the third signature are combined together to form a single multiple encoding signature.

18. A system as recited in claim 16, wherein the processor is configured to generate the first signature, the second signature, and the third signature, including by generating a label associated with a hash.

19. A system as recited in claim 16, wherein the first signature, the second signature, and the third signature are each encrypted hashes, and wherein the first signature, the second signature, and the third signature are packaged together to form a multiple encoding signature.

20. A computer program product, the computer program product being embodied in a computer readable storage medium and comprising computer instructions for:

generating a first signature of data, wherein the data is included in a first document, and wherein the first document has a first document encoding;

converting the first document from the first document encoding to a second document having a second document encoding, wherein the first document encoding and the second document encoding are different document encodings;

generating a second signature of data, wherein the data is included in the second document;

canonicalizing the first document from the first document encoding to a canonicalized first document having a canonical encoding, wherein canonicalizing the first document includes providing a different order of data within the first document based on a canonical ordering;

generating a third signature of data, wherein the data is included in the canonicalized first document; and associating the first signature, the second signature, and the third signature with the first document to provide a digitally signed first document.

21. A computer program product as recited in claim 20, wherein the first signature, the second signature, and the third signature are combined together to form a single multiple encoding signature.

22. A computer program product as recited in claim 20, wherein generating the first signature includes generating a label associated with a hash.

23. A computer program product as recited in claim 20, wherein the first signature, the second signature, and the third signature are each encrypted hashes, and wherein the first signature, the second signature, and the third signature are packaged together to form a multiple encoding signature.

* * * * *